(12) United States Patent
Swift et al.

(10) Patent No.: US 10,830,151 B2
(45) Date of Patent: Nov. 10, 2020

(54) GAS TURBINE ENGINE COUPLING ARRANGEMENT

(71) Applicant: ROLLS-ROYCE plc, London (GB)

(72) Inventors: Andrew Swift, Uttoxeter (GB); Stewart T. Thornton, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 16/410,312

(22) Filed: May 13, 2019

(65) Prior Publication Data

US 2019/0360403 A1 Nov. 28, 2019

(30) Foreign Application Priority Data

May 24, 2018 (GB) .................................. 1808544.9

(51) Int. Cl.
*F02C 7/32* (2006.01)
*F16H 57/021* (2012.01)
*F16H 57/023* (2012.01)
*F02K 3/06* (2006.01)

(52) U.S. Cl.
CPC ............. *F02C 7/32* (2013.01); *F16H 57/021* (2013.01); *F16H 57/023* (2013.01); *F02K 3/06* (2013.01); *F05D 2260/30* (2013.01); *F05D 2260/40311* (2013.01)

(58) Field of Classification Search
CPC .... F02C 7/36; F02C 7/32; F02C 3/107; F05D 2260/40311; F01D 15/12
See application file for complete search history.

(56) References Cited

U.S. PATENT DOCUMENTS

| | | | | |
|---|---|---|---|---|
| 8,875,378 | B2 * | 11/2014 | Coffin | F16B 35/04 |
| | | | | 29/525.11 |
| 9,556,894 | B2 * | 1/2017 | Coffin | F16B 35/04 |
| 10,519,805 | B2 * | 12/2019 | Smith | F01D 25/24 |

(Continued)

FOREIGN PATENT DOCUMENTS

| | | |
|---|---|---|
| DE | 3341141 A1 | 5/1985 |
| EP | 2589748 | 5/2013 |

(Continued)

OTHER PUBLICATIONS

Great Britain search report dated Nov. 26, 2018, issued in GB Patent Application No. 1808544.9.

(Continued)

*Primary Examiner* — Eldon T Brockman
(74) *Attorney, Agent, or Firm* — Shumaker & Sieffert, P.A.

(57) ABSTRACT

A coupling arrangement for a gas turbine engine. The arrangement comprises first, second and third members. The first member has a first threaded mating surface extending in a first direction (X) and a flange extending in a direction generally normal to the first direction (X). The second member has a second threaded mating surface extending in the first direction (X) and a flange extending in a direction generally normal to the first direction (X), the flanges of the first and second members engaging against one another. The third member has a third threaded mating surface configured to engage against the first threaded mating surface, and a fourth threaded mating surface configured to engage against the second threaded mating surface.

15 Claims, 8 Drawing Sheets

(56) References Cited

U.S. PATENT DOCUMENTS

2013/0111735 A1\* 5/2013 Coffin .................. F16B 5/0275
                                                                                       29/525.11
2014/0348577 A1\* 11/2014 Coffin .................... F01D 5/026
                                                                                        403/299
2016/0298492 A1\* 10/2016 Smith ...................... F02K 1/80

FOREIGN PATENT DOCUMENTS

| EP | 3091200 | 11/2016 |
| EP | 3121469 | 1/2017 |

OTHER PUBLICATIONS

Extended European Search Report from counterpart EP Application No. 19171890.7 dated Oct. 18, 2019, 7 pgs.
Response to the Extended European Search Report from counterpart EP Application No. 19171890.7 dated Oct. 18, 2019, filed Jan. 20, 2020, 50 pgs.

\* cited by examiner

GAS TURBINE ENGINE COUPLING ARRANGEMENT

CROSS-REFERENCE TO RELATED APPLICATIONS

This application is based upon and claims the benefit of priority from British Patent Application No. GB 1808544.9, filed on 24 May 2018, the entire contents of which are incorporated by reference.

BACKGROUND

Technical Field

The present disclosure concerns a coupling arrangement for a gas turbine engine.

Description of the Related Art

In the pursuit of improved fuel burn, geared fan drive aircraft turbofans are being developed. Design requirements stipulate that turbofan engine structures, mounts and adjacent aircraft structures are designed to withstand rapid seizure of the turbomachinery, usually 1 second from max speed to seized. Geared fan drive turbofans can potentially seize much more rapidly compared to direct drive turbofans if the power gearbox (PGB) jams in an abrupt seizure failure scenario, inducing large loads in the engine structures, mounts and pylon assembly. To avoid the additional weight burden in these structures if designed to withstand these large loads (less than 1 second turbomachinery seizures), fuse or disconnect devices are required at the attachment points between the PGB and the engine.

Additionally, in the case of large diameter (low specific thrust) geared fan drive turbofans, a locked fan may induce a level of asymmetric drag that is hazardous to aircraft directional control. Therefore a fuse or disconnect device between the fan and potentially seized PGB may be desirable to avoid this, or the alternative fuel burn detrimental effect (weight and drag) of redesigning the aircraft to accommodate such high locked fan drag levels. On the other hand, in some cases it may be desirable for the engine to be able to windmill whilst maintaining a connection between the fan and gearbox, such as where the engine has failed, but the gearbox has not seized. Such a method of operation may enable engine shaft driven generators, pumps etc to continue to operate in spite of engine shut-down. Other fuses between different rotating components, or between rotating and static components may also be desirable, to prevent large forces being transmitted in the event of a sudden seizure.

European patent publication EP 3121469 discloses a prior arrangement for disconnecting a fan from a PGB in a geared turbofan. In the arrangement described in EP 3121469, a helical thread is used to disengage an intermediate shaft between first and second shafts. The three shafts are held together by a shear pin.

SUMMARY

According to a first aspect there is provided a coupling arrangement for a gas turbine engine comprising:

a first member having a first threaded mating surface extending in a first direction and a flange extending in a direction generally normal to the first direction, a second member having a second threaded mating surface extending in the first direction and a flange extending in a direction generally normal to the first direction, the flanges of the first and second members engaging against one another;

a third member having a third threaded mating surface configured to engage against the first threaded mating surface, and a fourth threaded mating surface configured to engage against the second threaded mating surface, the third and fourth threaded mating surfaces being oppositely handed, the third member having a flange extending in a direction generally normal to the first direction and configured to engage against one of the first and second members; and an urging member configured to urge the third member into engagement against the first and second members, such that torque between the first and second members in a first relative direction causes compression of the flanges, and torque in a second relative direction greater than a predetermined amount causes disengagement of the third member from the first and second members.

Advantageously, rotation in a first direction causes the members to be compressed to one another, thereby increasing the strength of the coupling, and reducing fretting. On the other hand, rotation in the second direction causes disconnection. Such an arrangement therefore provides for a robust coupling arrangement which can accommodate a large load, but rapidly break in the event of a seizure of one of the components.

The urging member may comprise a fastener configured to extend between the flanges of the first, second and third members. Consequently, disengagement of the first and second members can be triggered by breaking of the fastener.

Alternatively, the urging member may comprise a resilient member such as a spring which may bias the flange of the third member toward the flanges of the first and second members. Advantageously, the spring can result in re-engagement of the third member with the first and second members in the event that the torque returns to the first relative direction in the event of an engine re-start.

The gas turbine engine may comprise a reduction gearbox which may couple a turbine shaft to a fan shaft. The reduction gearbox may comprise an epicyclic gearbox such as a planetary or a star gearbox.

The second member may comprise a fan shaft of the gas turbine engine. The first member may comprise an output shaft of the reduction gearbox of the gas turbine engine.

Alternatively, the first member may comprise a static structure of the gas turbine engine, and the second member may comprise one of a ring gear and a planet carrier of the reduction gearbox.

Where the reduction gearbox comprises a planetary gearbox, the second member may comprise a ring gear mount. Where the reduction gearbox comprises a star gearbox, the second member may comprise a planet carrier mount.

The threaded mating surfaces may extend in a generally axial direction, parallel to an engine main shaft axis. The flanges may extend in a direction generally normal to the axial direction, in a generally radial direction.

The third member may be provided radially outwardly of the first and second member, or may be provided radially inwardly of the first and second member. The flange of the first member may extend between the flanges of the second and third members.

According to a second aspect, there is provided a gas turbine engine comprising a coupling arrangement according to the first aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
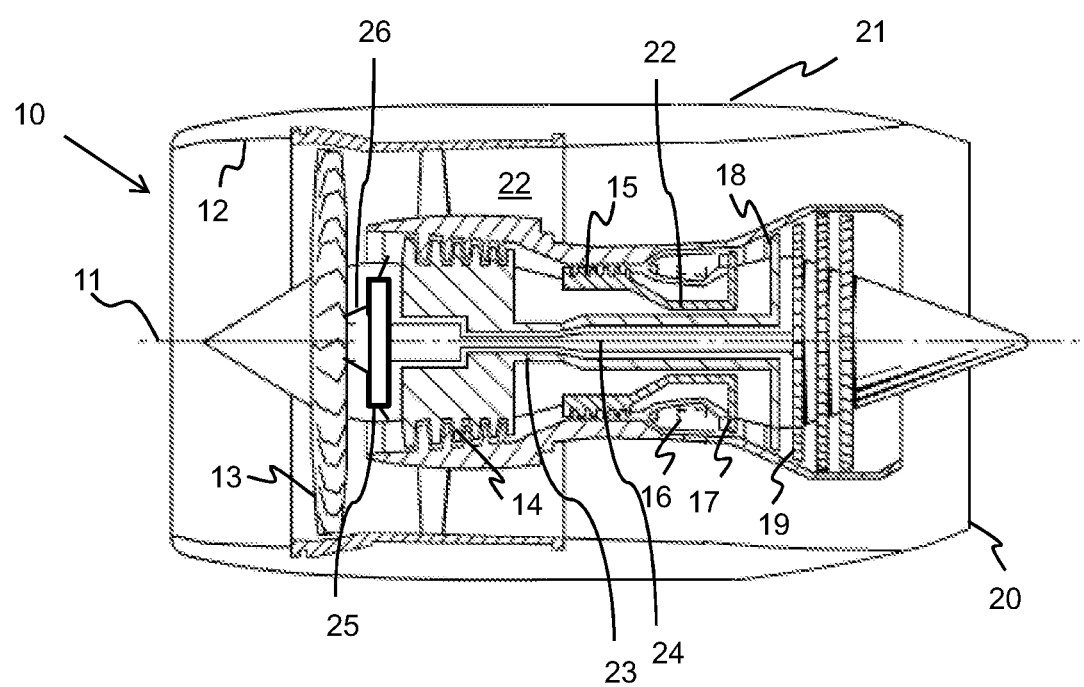
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, a low-pressure compressor 14, a high pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines the intake 12.

The gas turbine engine 10 works in the conventional manner so that air entering the intake 12 is accelerated by the fan 13 to produce two air flows: a first air flow into the compressor 14 and a second air flow which passes through a bypass duct 21 to provide propulsive thrust. The compressors 14, 15 compress the air flow directed into it before delivering that air to the combustion equipment 16.

In the combustion equipment 16 the air flow is mixed with fuel and the mixture combusted. The resultant hot combustion products then expand through, and thereby drive the turbines 17, 18, 19 before being exhausted through the nozzle 20 to provide additional propulsive thrust. The high 17, intermediate 18, and low 19 pressure turbines drive respectively the high pressure compressor 14, intermediate pressure compressor 14 and the fan 13, each by suitable interconnecting shaft 22, 23 24.

Other gas turbine engines to which the present disclosure may be applied may have alternative configurations. By way of example such engines may have an alternative number of interconnecting shafts (e.g. three) and/or an alternative number of compressors and/or turbines.

The low pressure shaft 24 drives the fan 13 via an epicyclic reduction gearbox 25, which drives an output shaft 26 to drive the fan 13. The area around the gearbox 25 is shown in more detail in FIG. 2.

Figure 2:
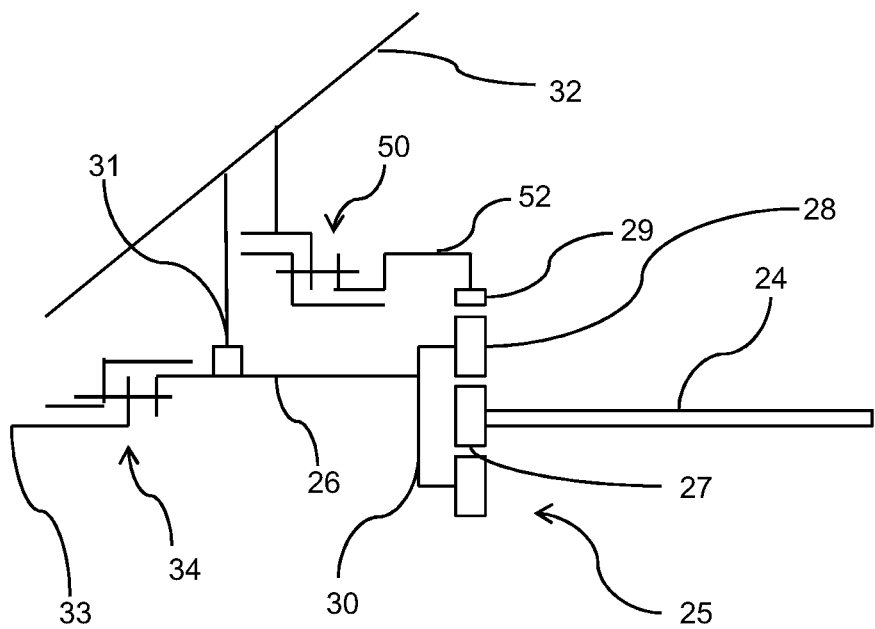
FIG. 2 is a sectional side view of part of the gas turbine engine of FIG. 1.

Referring now to FIG. 2, the reduction gearbox 25 comprises a sun gear 27 coupled to an input shaft in the form of the low pressure shaft 24. The sun gear 27 meshes with planet gears 28 which are arranged radially outward of the sun gear 27, and which in turn mesh with an annular ring gear 29 which surround the planet gears 28. The planet gears 28 are rotatably mounted to a planet carrier 30, which is in turn mounted for rotation.

In this first embodiment the reduction gearbox is in the form of a planetary gearbox 25, in which the ring gear 29 is held stationary, while the planets 28 and planet carrier 30 rotate in normal use. The output shaft 26 is mounted to the planet carrier 30, and is supported by a bearing 31 which is in turn mounted to static structure in the form of a forward gearbox mount 32.

The output shaft 26 is coupled to a fan stub shaft 33 by a first coupling arrangement 34. Similarly, the ring gear 29 is coupled to the forward gearbox mount 32 by a second coupling arrangement 50. The first coupling arrangement 34 is described in further detail below with reference to FIG. 3, while the second coupling arrangement 50 is described in further detail below with reference to FIG. 6.

Figure 3:
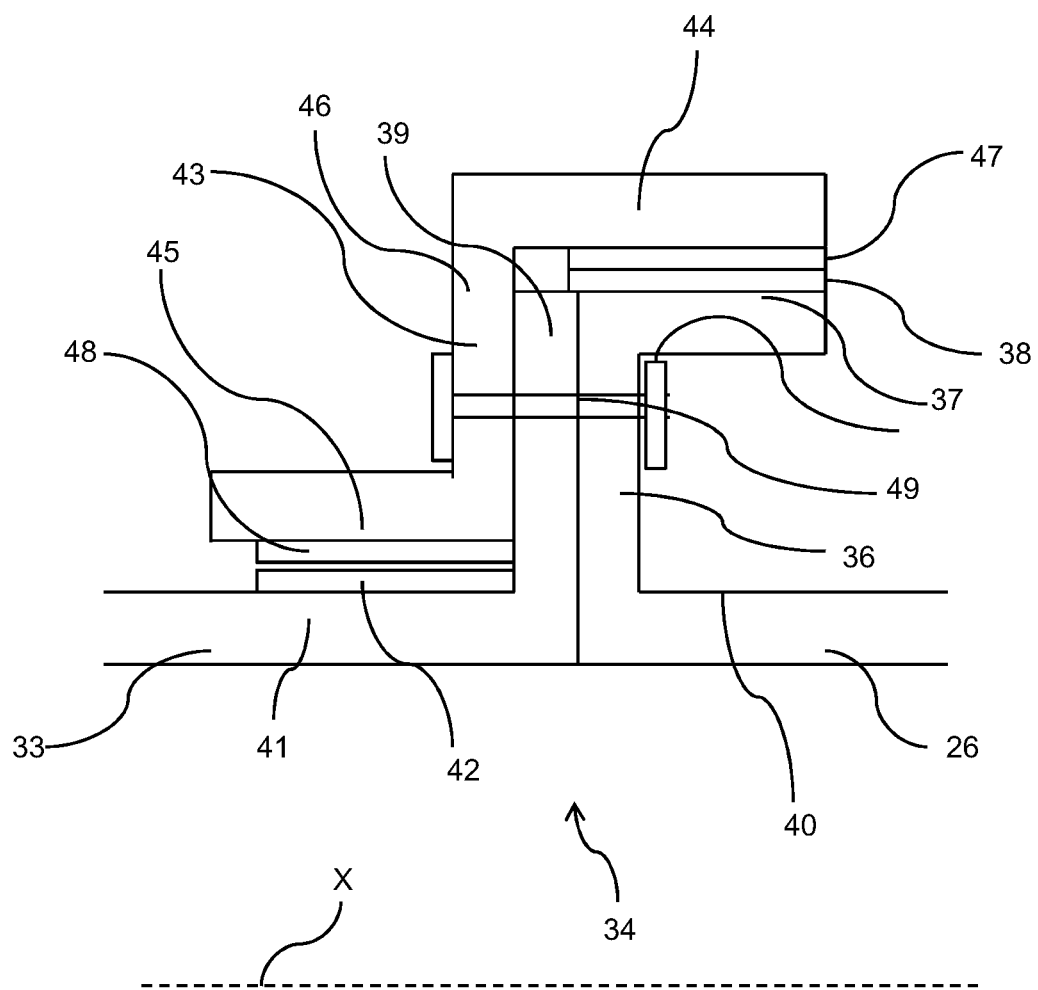
FIG. 3 is a close-up of a first coupling arrangement of the gas turbine engine of FIG. 2.

Referring now to FIG. 3, the coupling arrangement 34 is shown in more detail. The coupling arrangement 34 comprises a first member in the form of the output shaft 26, and a second member in the form of the fan stub shaft 33. The first and second members 26, 33 rotate about an axis X, which is parallel to the engine axis 11. Both the fan stub shaft 33 and the output shaft 26 rotate in a clockwise direction when viewed from the front of the fan 13.

The first member 26 comprises a generally axially extending main portion 40, which is joined to a flange 36 at its upstream end. The flange 36 extends in a generally radially outward direction, and faces a corresponding radially outward extending flange 39 of the second member 33. The flange 36 extends to a first mating surface 37, which again extends in a direction parallel to the axis X, and is provided radially outward of the main portion 40. The mating surface 37 has a threaded portion 38, which faces a radially outward direction. The threaded portion 38 comprises a left-handed thread, for reasons that will be explained further below.

Similarly, the second member 33 comprises a main portion 41, which terminates in the flange 39 at its downstream end. The main portion 41 comprises a radially outward facing second threaded mating surface 42. The second threaded mating surface 42 of the second member 33 has a thread which is oppositely handed (right-handed in this embodiment).

The first coupling arrangement 34 further comprises a third member 43. The third member 43 is provided adjacent the first and second members 26, 33, and is in contact with each. Alternatively, a spacer could be provided between the third member 43 and each of the first and second members 26, 33. The third member 43 is provided radially outward of the first and second members 26, 33, and comprises generally axially extending third and fourth mating surfaces 44, 45 joined by a generally radially extending flange in the form of a main portion 46. The third and fourth mating surfaces 44, 45 comprise a third threaded portion 47 and a fourth threaded portion 48 respectively, which are configured to engage with the first and second threaded portions 38, 42 of the first and second members 26, 33 respectively. Consequently, the third threaded portion 47 of the third member 43 comprises a left handed thread, while the fourth threaded portion 48 of the third member 43 comprises a right handed thread. In other words, the two threads of the third member 43 are oppositely handed.

The first, second and third members 26, 33, 43 are coupled together by an urging member. In the first embodiment, the urging member comprises a fastener in the form of a bolt 49. As will be understood, the fastener could take different forms, such as a screw, rivet, weld, or other suitable means for fastening the first, second and third members 26, 33, 43 together. The bolt 49 extends through an aperture in the radially extending main portions 36, 39, 43, such that the main portions 36, 39, 43 of the first, second and third members 26, 33, 43 are held together under compression when the bolt is secured. In general, a plurality of bolts 49 will be provided, circumferentially distributed about the first, second and third members 26, 33, 43.

In normal use, the coupling arrangement acts as follows. With the engine 10 running, and the coupling arrangement 34 intact, torque is transferred between the input shaft 26 and the fan stub shaft 33 via the coupling 34. During accelerations and steady state running, torque will generally be transferred from the input shaft 26 to the fan shaft 33, whereas during sudden decelerations and during engine shutdown, torque will generally be transferred in the opposite direction.

Figure 4:
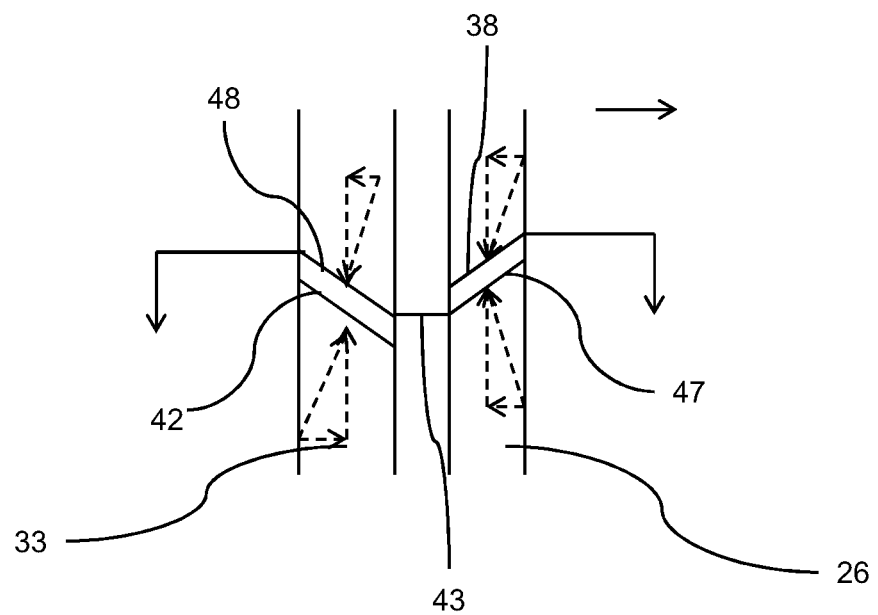
FIG. 4 is a diagram showing forces imposed on the coupling arrangement in a normal operating condition.

FIG. 4 illustrates the forces acting on the coupling arrangement 34 during steady state and accelerating conditions, where torque is transferred from the output shaft 26 to the fan stub shaft 33. Torque is initially transferred from the first member 26 to the third member 43 via the respective first threaded portions 38, 47. Torque is then transferred from the third member 43 to the second member 33 via the respective second threaded portions 42, 48. Consequently, each thread pair (i.e. the first threads 38, 47 representing a first pair, and the second threads 42, 48 representing a second pair) comprises a driving thread and a driven thread. In the case of the first pair, the driving thread is the thread 38 of the first member 26, since this is the member that torque is transferred from. In the case of the second pair, the driving thread is the thread 48 of the third member 43, while the driven thread is the thread 42 of the second member 33.

The dotted arrows in FIG. 4 represent the forces imposed on the threads between the driving and the driven threads. As can be seen, in view of the first threaded portions 38, 47 having oppositely handed threads to the second threaded portions 42, 48, the third member 43 is driven toward the right as shown in FIG. 4 (i.e. in the downstream direction), toward the opposing main portion 9 of the second member 26. This is because the reaction force from the driven left handed first thread 38 of the third member 43 drives the third member 43 to the right, while the reaction force from the driven right handed second thread 42 acts on the driving thread 48 of the third member 43 to also drive the third member 43 to the right, i.e. into compression with the second member. Consequently, both thread pairs 38, 47, 42, 48 share the load, in driving the second and third members 33, 43 together. Since the first member (i.e. output shaft) is rigidly located, the first, second and third members 26, 33, 43 are all compressed together. Torque is also transferred directly from the first member 26 to the third member 43 via the bolt 49 and the opposing main portions 36, 39. The compression of the first, second and third members 26, 33, 43 together by the threaded splines 38, 47, 42, 48 ensure that substantially no slip occurs when torque is transferred, thereby reducing fretting and wear. In practice, relatively little torque is transferred by the bolt 49 itself, since the large contacting surfaces (i.e. the mating surfaces and main portions) transfer substantially all of the load.

Figure 5:
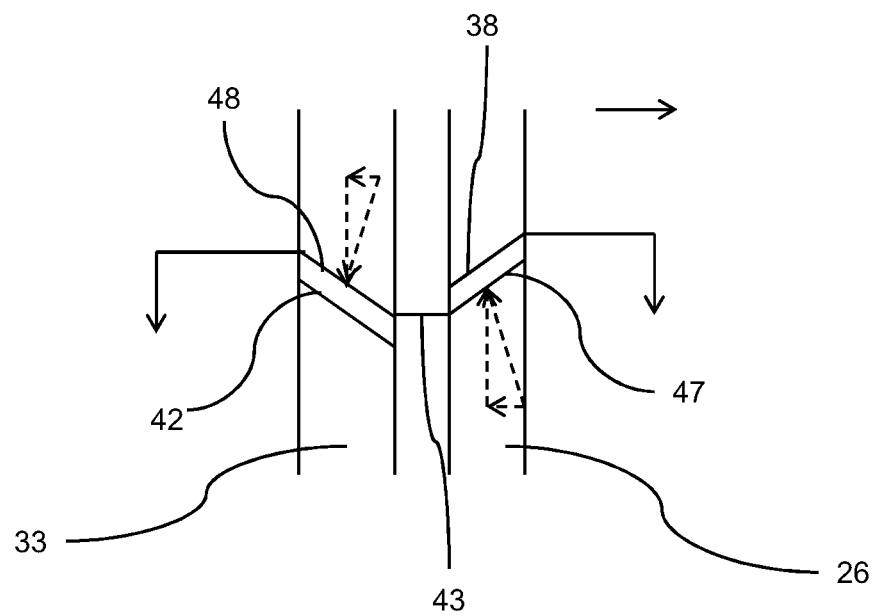
FIG. 5 is a diagram showing forces imposed on the coupling arrangement in a failure condition.

FIG. 5 illustrates the forces acting on the coupling arrangement 34 during decelerating conditions, where torque is transferred from the output shaft 26 to the fan stub shaft 33. Such conditions will also occur in the event of a seizure of the gearbox output shaft 26. As described previously, in such a case, large torques will be transferred between the fan stub shaft 33 and the output shaft 26 in view of the rotational inertia of the fan 13, and wind-milling of the fan should the seizure occur in flight.

Both the output shaft 26 and the fan stub shaft 33 continue to rotate in the same direction, i.e. clockwise when viewed from the front. Torque is initially transferred from the second member 33 to the third member 43 via the respective second threaded portions 42, 48. Torque is then transferred from the third member 43 to the first member 26 via the respective first threaded portions 38, 47. Consequently, each thread pair (i.e. the first threads 38, 47 representing a first pair, and the second threads 42, 48 representing a second pair) again comprises a driving thread and a driven thread. In the case of seized or decelerating operation, the driving thread of the first pair is now the thread 38 of the first member 26, since this is the member from which torque is transferred. In the case of the second pair, the driving thread is the thread 48 of the third member 43, while the driven thread is the thread 42 of the second member 33. Consequently, the forces provided by the threads produce an overall force on the third member 43 in the opposite direction, i.e. the upstream direction, (left as shown in the diagram on FIG. 5), axially away from the first and second members 26, 33. Again, the torque is shared by both thread pairs. This load is reacted by the second member 33 against the first member 26, such that the flanges 36 39 continue to be pressed against one another, so that rotational load can be carried by these surfaces.

Consequently, the bolt 49 is put under tension. The tension provided by the coupling arrangement 34 is dependent on the pitch (i.e. the helix angle) of the threads 38, 47, 42, 48 and the torque transmitted. Typically, the threads have a pitch of between 10 degrees and 35 degrees of angle, with the tensile load increasing for a given torque as the pitch angle increases. As will be appreciated, the bolt 49 is tensioned by both thread pairs 38, 47, 42, 48. Consequently, for a given thread pitch, a relatively large tensile load is placed on the bolt 49. Nevertheless, during windmill operation, the bolt 49 remains intact, and so the fan stub shaft 33 remains attached to the output shaft 26, provided the torque, and so the tension and shear forces on the bolt 49, remains below a predetermined amount.

In the event that the predetermined torque is exceeded, the bolt 49 fails, i.e. is pulled apart by the threads 38, 47, 42, 48. Such an event may occur for example where the gearbox 25 seizes while the engine 10 is operating. In such a case, the incoming airflow and inertia of the fan 13 will continue to rotate the stub shaft 33, while the output shaft 25 remains static. Clockwise rotation of the fan stub shaft 33 will then cause the right hand threads 42, 48 to impose an axially forward (left on the drawings) load on the third member 43, and an axially rearward load on the second member 33, which is then transmitted to the first member 26. Consequently, the first and third members 26, 43 are pulled in opposite directions, again placing tension on the bolt 49. In this case however, the tension exceeds the predetermined amount, and the bolt 49 fails.

Once the bolt 49 has failed, the third member 43 is free to move axially forward, away from the first and second members 26, 33. With the third member 43 no longer in contact with the second member 33, the flange 39 of the second member 33 is no longer forced against the flange 36 of the first member 26. With neither the bolt 49, nor contact between the flanges 36, 39 ensuring co-rotation of the first and second members 26, 33, the second member (i.e. the fan shaft 33) is free to rotate independently of the first member 26, allowing free rotation of the fan 13 in spite of a seized gearbox 25.

Such an arrangement allows for quick, reliable separation of the output shaft 26 and fan stub shaft 33 in the event of a gearbox seizure. On the other hand, during windmilling, co-rotation of the fan 13 and gearbox 25 is maintained by breaking the bolt in tension rather than in shear. As will be understood, the tensile forces required to break the bolt can generally be calculated by multiplying the Ultimate Tensile Strength of the material of the bolt by the cross sectional area of the bolt at its thinnest part. By ensuring the bolt fails in tension rather than shear, this results in more reliable failure at a relatively precise predetermined torque, as the ultimate tensile strength of a component can be more repeatably determined than shear strength. The arrangement is also highly compact, having a short axial length. On the other hand, during normal operation, the coupling contributes to the structural integrity of the arrangement, by providing additional compression between the flanges 36, 39 of the output shaft 26 and the fan stub shaft 33.

Figure 6:
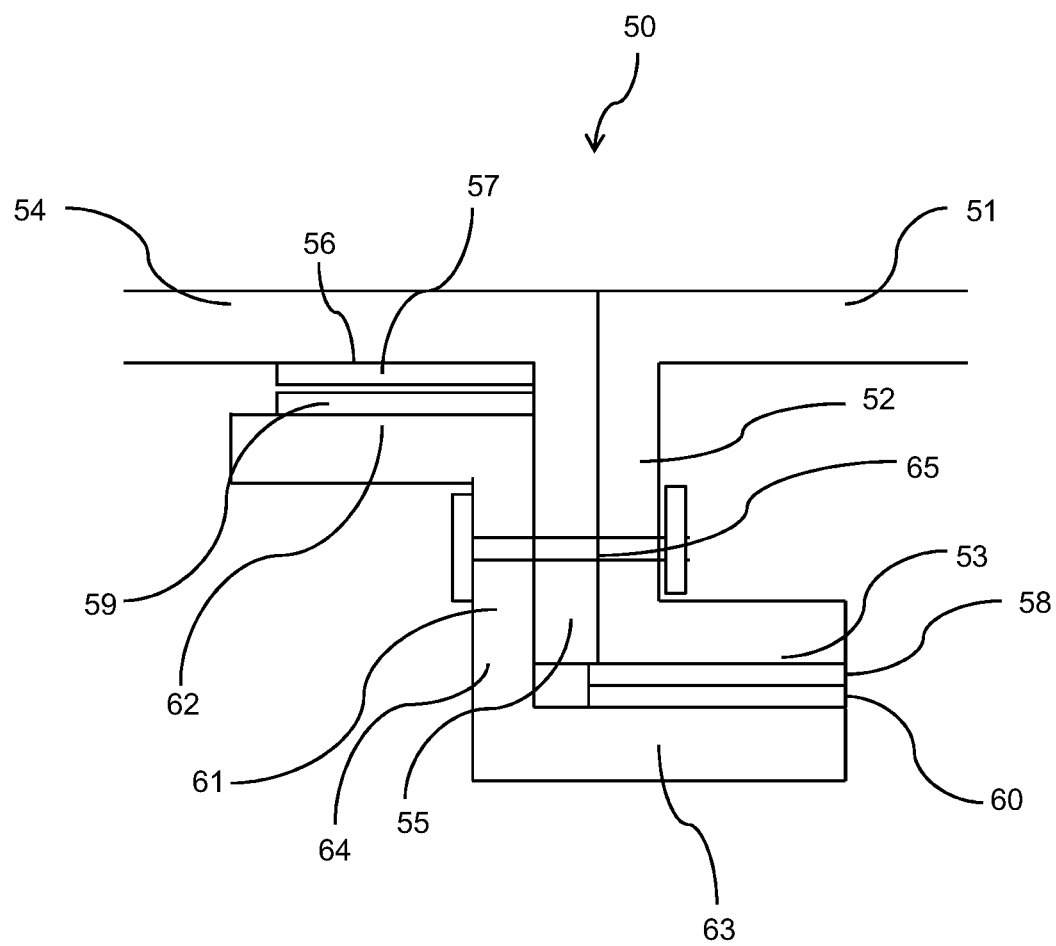
FIG. 6 is a close-up of a second coupling arrangement of the gas turbine engine of FIG. 2.

Optionally, the engine includes a second coupling arrangement 50, shown in FIGS. 2 and 6. The further coupling arrangement 50 is configured to couple a static component of the gearbox 25 (i.e. the ring gear 29 in this embodiment) to a further static component (the engine gearbox housing 32 in this embodiment) of the engine 10. Again, the coupling is configured to disengage the static gearbox component from the static engine component in the event of a gearbox seizure.

Referring to FIG. 5, the second coupling arrangement 50 comprises a first member 51, which is coupled to the ring gear 29 via a ring gear mount 52 (shown in FIG. 2). The first member 51 is similar to the first member 26 of the first coupling arrangement 34, in that is comprises a flange 52, and a threaded mating surface 53 comprising a threaded portion 58.

The second coupling arrangement 50 further comprises a second member 54 which is coupled to the engine gearbox housing 32. Again, the second member 54 is similar to the second member 33 of the first coupling arrangement 34, in that is comprises a flange 55, and a threaded mating surface 56 comprising a threaded portion 57.

The threaded portions 57, 58 engage against respective threaded portions 59, 60 of a third member 61. The third member 61 is provided radially inwardly and overlapping with the first and second members 51, 54. The third member comprises a first mating surface 62 which comprises the first threaded portion 59 and a second mating surface 63, which comprises the second threaded portion 60. A flange 64 extends between and joins the first and second mating surfaces 62, 63. The flange 64 extends radially, and engages against the flange 55 of the second member 54. Again, the threads 57, 59 are oppositely handed to the threads 58, 60.

Finally, a fastener in the form of a bolt 65 extends through the flanges 52, 55, 64 of the first 51, second 54 and third 61 members.

The second coupling arrangement 50 operates in a similar manner to the first. In normal operation, relatively little torque is transmitted between the first member 51 and the second member 54, as the majority of the torque is transmitted from the input shaft 24 to the output shaft 26 via the planet carrier 30. However, in the event of a seizure of the planet carrier or the planet gears 28, the inertia of the fan 13, gearbox 25, and engine core (i.e. the compressors, shafts and turbines) will be transmitted to the engine housing 32 via the ring gear 29. Consequently, it is desirable to de-couple the ring gear 29 from the housing 32 in the event of a seizure. Such a de-coupling must be automatic and extremely rapid, in view of the very sudden and large loads that will otherwise be transmitted to the engine housing 32. The second coupling arrangement 50 achieves such a rapid decoupling in a weight efficient, compact, reliable manner.

In the event of a gearbox seizure, the second coupling arrangement 50 operates in a similar manner to the first. The sudden seizure results in a large torque can transmitted to the ring gear 29. This large torque causes rotation of the ring gear mount 52 in an anti-clockwise direction. This anti-clockwise direction torque rotates the first member 51 in the anti-clockwise direction, which causes the right handed threads 58, 60 of the first and third members 51, 61 to urge the third member 61 in the forward direction, away from the first and second members 51, 54. Similarly, the left handed threads 57, 59 of the second and third members 54, 61 also urge the third member 61 in the forward direction, away from the first and second members 51, 54. Consequently, the tension is placed on the bolt 65, which exceeds a predetermined amount, such that the bolt 65 fails. Consequently, the first and second members 51, 54 are disconnected, allowing the ring gear 29 to freely rotate, while the engine slows down. Consequently, only the bolts 65 of the coupling arrangement 50 are damaged, allowing straightforward repair of the engine, and preventing further structural damage.

Figure 7:
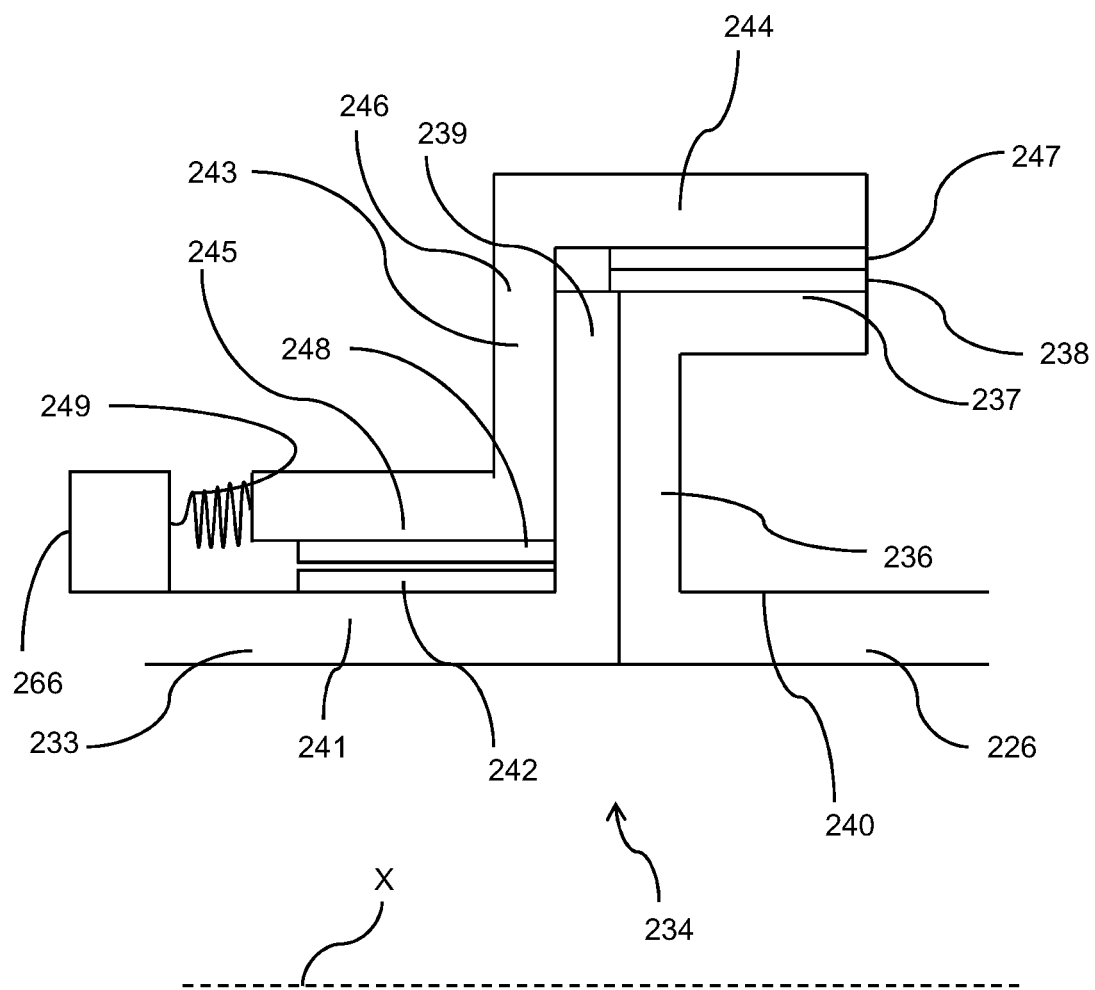
FIG. 7 is a close-up of an alternative coupling arrangement for the gas turbine engine of FIG. 2.

FIG. 7 shows an alternative coupling arrangement 234 suitable for use for the gas turbine engine 10. Equivalent components are given the same numbering as for the previous embodiment, but with the numbering incremented by 200.

The coupling arrangement 234 is substantially the same as the arrangement 34. However the urging member is provided in the form of a resilient member comprising a spring 249 in place of the bolt 49. The spring 249 extends between a mounting location 266, which is coupled to the second member (i.e. the fan shaft 233), and an end surface of the third member 243. Consequently, the spring 249 urges the third member into engagement against the second member 233. Consequently, in the event of torque being applied in the clockwise direction from the second member 233, an axial force is applied to the spring 249. This axial force will again depend on the helix angle of the threads 238, 242, 247, 248, and the torque. Consequently, where the torque exceeds a predetermined amount, the spring will allow the flanges of the second and third members to move out of engagement, and the threads to disengage, thereby allowing for relative rotation of the first and second members. It will be understood that this predetermined torque can be calculated on the basis of the spring constant of the spring 249. On the other hand, where the torque falls below this predetermined amount, the spring 249 will urge the second and third members back into engagement, allowing for transmission of torque to the fan again in the event of an engine re-light.

Figure 8:
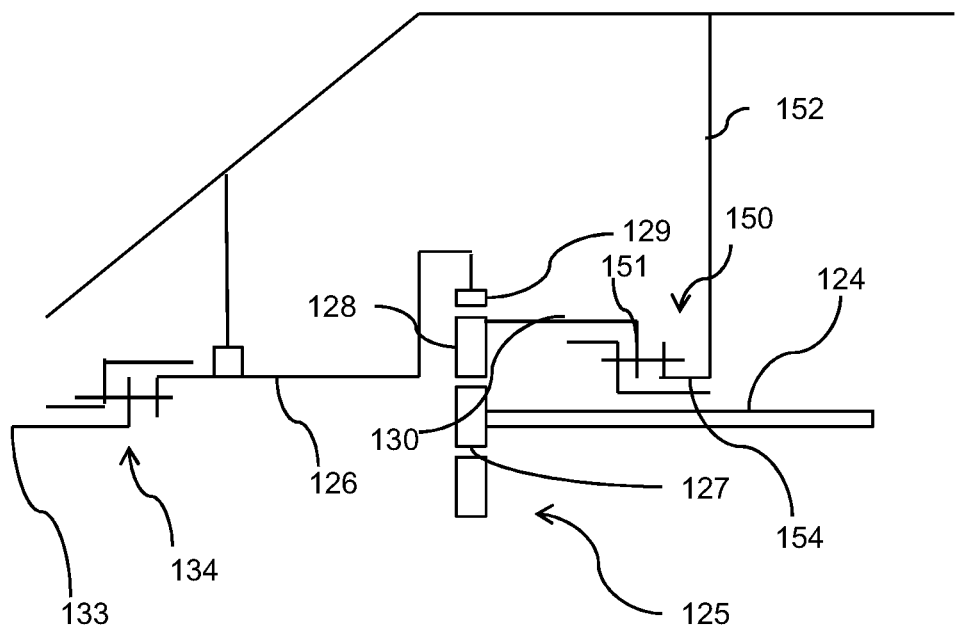
FIG. 8 is a sectional side view of part of an alternative gas turbine engine.

FIG. 8 shows part of an alternative gas turbine engine 110 having an epicyclic gearbox 125 in the form of a "star" gearbox.

The star gearbox 125 is similar to the planetary gearbox 25 of the previous embodiment, and has a sun gear 127 coupled to a low pressure turbine shaft 124, planet gears 128 coupled to a planet carrier 130, and a ring gear 129. The star configuration of the gearbox 125 differs from the planetary configuration in that the planet carrier 130 is rotationally fixed by a static structure comprising a planet carrier mount 152 and second coupling 150, while the ring gear 129 is rotationally mounted, and comprises an output shaft 126 which is mounted to a fan shaft 133 via a first coupling 134. The remainder of the gas turbine engine 110 is substantially the same as the gas turbine engine 10.

The first coupling 134 is similar to the first coupling 34 of the previous embodiment. However, the first member comprises the output shaft 126 which is coupled to the ring gear 129, and the second member comprises the fan shaft 133.

Similarly, the second coupling 150 is similar to the second coupling 50 of the previous embodiment, with the exception that the first member 151 is coupled to the planet carrier 130, and the second member 154 is coupled to the planet carrier mount 152.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, where the fan normally rotates in an anti-clockwise direction, the thread directions will be reversed, with the first member comprising a left-handed threaded mating surface, and the second member comprising a right-handed threaded mating surface.

Similarly, the predetermined force could be varied in dependence on the operating requirements. For example, the predetermined force could be low, such that the bolt breaks in the event that the torque flow is reversed, i.e. in the event that the engine windmills while the engine is shutdown. In that case, the gearbox would be disconnected in the event of an in-flight engine failure, allowing windmilling of the engine, while not requiring rotation of the gearbox. such an arrangement would allow for deletion of the auxiliary oil systems for lubrication of gearbox bearings that might otherwise be necessary in the event of an engine shutdown.

The arrangement could be employed in a direct-drive engine, in which a turbine is directly coupled to the fan. In such a case, a coupling arrangement could comprise the spline between the turbine shaft and the fan shaft, and could de-couple the fan and turbine shafts in the event of a bearing failure of a severe fan failure. The arrangement could similarly be applied to non-aircraft gas turbine engines, such as ship or shore based gas turbine engines.

The invention claimed is:

1. A coupling arrangement for a gas turbine engine comprising:
a first member having a first threaded mating surface extending in a first direction and a flange extending in a direction generally normal to the first direction,
a second member having a second threaded mating surface extending in the first direction and a flange extending in a direction generally normal to the first direction, the flanges of the first and second members engaging against one another;
a third member having a third threaded mating surface configured to engage against the first threaded mating surface, and a fourth threaded mating surface configured to engage against the second threaded mating surface, the third and fourth threaded mating surfaces being oppositely handed, the third member having a flange extending in a direction generally normal to the first direction and configured to engage against one of the first and second members; and
an urging member configured urge the third member into engagement against the first and second members such that torque between the first and third members in a first relative direction causes compression of the flanges, and torque in a second relative direction greater than a predetermined amount causes disengagement of the third member from the first and second members.

2. An arrangement according to claim 1, wherein the urging member comprises a fastener configured to extend between the flanges of the first, second and third members.

3. An arrangement according to claim 1, wherein the urging member comprises a resilient member arranged to bias the flange of the third member toward the flanges of the first and second members.

4. An arrangement according to claim 3, wherein the first member comprises a static structure of the gas turbine engine, and the second member comprises one of a ring gear and a planet carrier of the reduction gearbox.

5. An arrangement according to claim 1 wherein the gas turbine engine comprises a reduction gearbox which couples a turbine shaft to a fan shaft.

6. An arrangement according to claim 5, wherein the reduction gearbox comprises an epicyclic gearbox such as a planetary or a star gearbox.

7. An arrangement according to claim 6, wherein the epicyclic gearbox comprises a planetary gearbox, and the second member comprises a ring gear mount.

8. An arrangement according to claim 5, wherein the first member comprises an output shaft of the reduction gearbox.

9. An arrangement according to claim 1, wherein the second member comprises a fan shaft of the gas turbine engine.

10. An arrangement according to claim 9, wherein the reduction gearbox comprises a star gearbox and the second member comprises a planet carrier mount.

11. An arrangement according to claim 1, wherein the threaded mating surfaces each extend in a generally axial direction, parallel to an engine main shaft axis.

12. An arrangement according to claim 1, wherein the flanges each extend in a direction generally normal to the axial direction, in a generally radial direction.

13. An arrangement according to claim 1, wherein the third member is provided either radially outwardly of the first and second member, or radially inwardly of the first and second member.

14. An arrangement according to claim 1, wherein the flange of the first member extends between the flanges of the second and third members.

15. A gas turbine engine comprising a coupling arrangement according to claim 1.

* * * * *